United States Patent [19]

Niederer

[11] E Patent Number: Re. 33,111

[45] Reissued Date of Patent: Nov. 14, 1989

[54] METHOD AND APPARATUS FOR AUTOMATICALLY DOFFING AND DONNING TAKE-UP PACKAGES ON A WINDER

[75] Inventor: Kurt W. Niederer, Charlotte, N.C.

[73] Assignee: Belmont Textile Machinery Company, Belmont, N.C.

[21] Appl. No.: 199,117

[22] Filed: May 26, 1988

Related U.S. Patent Documents

Reissue of:

[64] Patent No.: 4,591,105
Issued: May 27, 1986
Appl. No.: 597,636
Filed: Apr. 6, 1984

[51] Int. Cl.[4] ..... B65H 67/04

[52] U.S. Cl. ..... 242/18 A; 242/18 PW; 242/18 DD; 242/35.5 A; 242/36

[58] Field of Search ..... 242/18 A, 18 PW, 18 DD, 242/18 R, 25 A, 36, 35.5 A, 35.5 R, 35.6 R

[56] References Cited

U.S. PATENT DOCUMENTS

| | | | |
|---|---|---|---|
| 2,733,870 | 2/1956 | Furst | 242/35.6 |
| 3,033,478 | 5/1962 | Furst | 242/35.6 |
| 3,077,311 | 2/1963 | Furst | 242/35.5 |
| 3,078,054 | 2/1963 | Furst | 242/35.5 |
| 3,092,340 | 6/1963 | Furst | 242/35.5 |
| 3,131,885 | 5/1964 | Furst et al. | 242/129.51 |
| 3,160,359 | 12/1964 | Furst | 242/35.5 |
| 3,307,794 | 3/1967 | Furst | 242/35.5 |
| 3,429,514 | 2/1969 | Pospisil et al. | 242/18 A |
| 3,682,403 | 8/1972 | Willis | 242/18 A |
| 3,741,490 | 6/1973 | Venot | 242/18 A |
| 3,899,140 | 8/1975 | Gleyze | 242/18 A X |
| 3,940,077 | 2/1976 | Ohashi | 242/18 A X |
| 3,942,731 | 3/1976 | Lattion | 242/35.5 A X |
| 4,015,786 | 4/1977 | Slavik et al. | 242/18 A X |
| 4,079,898 | 3/1978 | Murakami et al. | 242/35.5 A |
| 4,154,411 | 5/1979 | Kamp et al. | 242/35.5 R |
| 4,335,859 | 6/1982 | Courvoisier | 242/35.5 A |
| 4,352,466 | 10/1982 | Baumges | 242/18 PW |
| 4,451,007 | 5/1984 | Ohkubo et al. | 242/35.5 A X |

FOREIGN PATENT DOCUMENTS 2302950 10/1976 France .

*Primary Examiner*—Stanley N. Gilreath
*Attorney, Agent, or Firm*—W. Thad Adams, III

[57] ABSTRACT

A strand processing machine (10) is shown for winding a strand from a strand supply source onto a take-up package. A positive control apparatus is provided for doffing a full take-up package from and donning an empty take-up package onto the yoke assembly (60). The doffing and donning apparatus comprises a yoke actuator arm (62) which pivots yoke arms (70,71) away from a drive roll (32) under positive control to a conveyor (30). The take-up package is deposited on conveyor (30) and the yoke arms (70,71) return to donning position under positive control. An empty take-up package is moved by a magazine (36) to the empty yoke arms (70,71). The empty take-up package is donned onto the yoke assembly and the free end of the strand to be wound onto the take-up package is attached thereto in closely adjacent relation to the drive roll (32) before winding is resumed.

34 Claims, 11 Drawing Sheets

METHOD AND APPARATUS FOR AUTOMATICALLY DOFFING AND DONNING TAKE-UP PACKAGES ON A WINDER

Matter enclosed in heavy brackets [ ] appears in the original patent but forms no part of this reissue specification; matter printed in italics indicates the additions made by reissue.

TECHNICAL FIELD AND BACKGROUND OF THE INVENTION

This invention relates to a method and apparatus for automatically doffing and donning take-up packages from a winder. The particular disclosure of this application is that of a textile winder which is used to wind yarn onto take-up packages suitable for further processing. However, the disclosure of this application can be utilized in other fields and for this reason relates broadly to strand processing.

At one time the textile winding process was a relatively simple one. Empty take-up packages were manually loaded onto each take-up station of a winder. The winder was manually activated to begin the winding process and when the take-up packages were full they were manually removed from the winder and empty take-up packages substituted in their place. However, the necessity of automating the winding process was recognized and, as with most other textile processes, the winding process was automated to the extent possible by providing means for automatically doffing and/or donning take-up packages in order to reduce the amount of labor necessary to operate the machines and decrease doffing time.

Therefore, what at one time was a relatively simple but labor-intensive manual procedure has become a relatively complicated automatic procedure. In the design of any automatic doffing and donning system, a number of design criteria should be considered and met in order to have a functionally sufficient system. First, the full take-up package must be moved relatively quickly and without damage to newly-wound yarn. The empty take-up package must be donned securely on each cycle. The cut yarn must be securely held while the doffing and donning process takes place and then securely attached to the empty take-up package before winding begins. While the yarn is being held care must be taken to make sure that the yarn does not come slack before it becomes attached to the new take-up package. Slack yarn can cause the yarn to break or pull loose from the take-up package when winding begins or snag on the chuck or other machine parts.

An automated doffing and donning system must also have a sensing mechanism which senses an improperly donned package or the absence of an empty supply package in the magazine. Such a system should also permit individual positions to be locked out of operation when less than a full machine is being operated.

It is most important to maintain positive control of the take-up package at all points during the doffing and donning process. As a practical matter, this means that the package should not be dropped by or rolled from the chuck into a conveyor or other discharge mechanism. Preferably, the full take-up package should be disengaged from the chuck directly onto the conveyor or other discharge means without intermediate handling of the package. This avoids needless complication in the mechanism.

In addition, the use of certain types of components in the doffing and donning mechanism should be minimized. Air cylinders, complicated electrical relays and the like require frequent and sensitive adjustment and are subject to sticking because of environmental contaminants. To the maximum extent possible cams, gears, and other mechanical or electro-mechanical devices should be relied upon because of their durability and ease of adjustment. In addition, the movement of the yoke between the winding, doffing and donning positions should be as simple as possible and should cover no more distance than is absolutely necessary. Reducing the distance between these various points in the winding mechanism reduces the possibility of tangles in the yarn and loss of control of the relatively heavy, full take-up package.

Prior art devices have attempted with varying degrees of success to meet the requirements of some of the abovestated criteria. Often, however, one or more of these problems have been solved only at the expense of creating other problems or, at the very least, increasing the mechanical complexity and hence, cost of the machine.

SUMMARY OF THE INVENTION

Therefore, it is an object of the invention to provide a method and apparatus for doffing and donning take-up packages from a winder wherein the take-up packages are maintained under positive control of the chuck and yoke at all times during the doffing and donning procedure. It is another object of the present invention to provide a method and apparatus for automatically doffing and donning take-up packages which prevents the yarn from becoming slack during the doffing and donning process.

It is another object of the present invention to provide a method and apparatus for automatically doffing and donning take-up packages wherein the yarn is attached to the empty take-up packages at a position in closely-adjacent relation to the drive roll in order to prevent tangles and slack yarn.

It is another object of the present invention to provide an apparatus which permits the yoke to pivot freely during the winding process as the diameter of the take-up package increases but is nevertheless held under positive control during the doffing and donning process.

These and other objects and advantages of the present invention are achieved in the preferred embodiment of the method and apparatus below by providing a winder having a supply package, a yoke having a chuck for holding a take-up package, a drive roll for driving the take-up package to thereby wind yarn from the supply package to the take-up package, a guide for guiding the yarn onto the take-up package in a predetermined pattern and a yarn cutter for cutting the yarn from the take-up package to be doffed and a conveyor for receiving a full take-up package from the yoke and moving it to a discharge point. In connection with the above-described winder, the improvement is provided which comprises means for pivoting the yoke away from the drive roll under positive control to the conveyor and depositing the take-up package on the conveyor and returning the empty yoke to a donning position. Means are provided for moving an empty take-up package to the chuck of the yoke, donning the take-up package into the chuck of the yoke and attaching the free end of the strands to be wound onto the take-up package and closely spaced-apart relation to the drive roll before driving contact between the new take-up package and the drive roll is resumed. The free end of the strand is attached to the empty take-up package at such a close position to the drive roll that the strand remains relatively taut as the take-up package moves into contact with the drive roll and is not susceptible to being tangled or jerked by the take-up package as winding starts.

The apparatus includes a bail for moving between the drive roll and the take-up package to carry the strand to a point beyond one axial end of the take-up package during doffing and during donning until the strand is attached to the empty take-up package.

Preferably, the take-up package is transferred to the chuck of the yoke in close, spaced-apart relation to the drive roll and at the same point as the strand is attached to the empty take-up package. Preferably, the spaced-apart relation is no more than ten degrees of arc from the driving position against the roll in order to prevent the strand attached to the empty take-up package from going slack as the empty take-up package moves from its donning position into its driving position.

According to the embodiment of the invention described below, the yoke is mounted on a fixed pivot intermediate the conveyor and the drive roll for pivotal movement therebetween.

The apparatus according to this invention preferably includes escapement means for permitting the yoke to freely move away from the drive roll as the diameter of the take-up package increases while enabling the yoke to be positively controlled in both its movement to the conveyor and its return movement to the donning position and the winding position in contact with the drive roll.

Preferably, the escapement means comprises a pin mounted on the yoke for movement in a pre-determined arc as the diameter of the take-up package increases. A yoke pin assembly is provided having an arcuate slot therein corresponding to the arc of movement of the yoke pin and in which the yoke pin progressively moves as the diameter of the take-up package increases. A stop is defined by the yoke pin assembly at one end of the slot. A yoke actuator is provided for moving the yoke pin assembly to the position where the yoke pin bears against the stop. Thereafter, pivotal motion of the yoke actuator is transmitted to the yoke and the take-up package is moved.

Locking means are provided for locking the yoke pin against the stop and preventing the yoke from falling under its own weight as the yoke is pivoted towards the conveyor over center and into its doffing position.

In accordance with the method of doffing and donning a take-up package on a winder, the yoke is pivoted away from the drive roll under positive control to the conveyor and the take-up package is deposited on the conveyor. The yoke is pivoted back to a donning position and an empty take-up package is donned onto the yoke. The strand is attached to the empty take-up package while the empty take-up package is positioned in closely spaced-apart relation to the drive roll and then the yoke with the newly donned take-up package thereon is moved into driving contact with the drive roll.

The method preferably includes a step of moving a bail between the drive roll and the full take-up package before doffing to carry the strand to a point beyond one axial end of the take-up package during doffing and during donning until the strand is attached to the empty take-up package.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBDOIMENT

Figure 1:
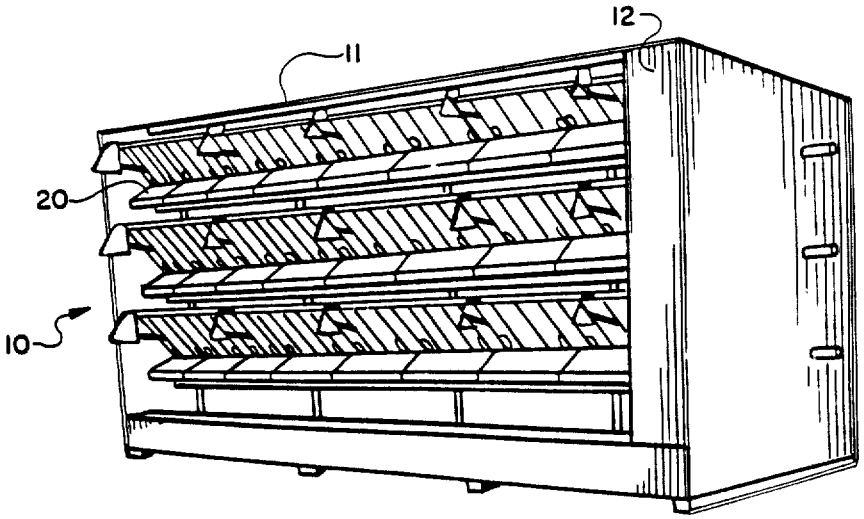
FIG. 1 is a perspective view of a winder according to the present invention having 24 winding stations.

Referring now specifically to the drawings, a winder incorporating a doffing and donning apparatus according to the present invention is shown and generally designated at reference numeral 10. Winder 10 includes an enclosure 11 within which the components of the winder 10 are located. Enclosure 11 includes a drive and cam housing 12 on one end within which the various drive components and cam components are housed. In the winder 10 shown in FIG. 1, 24 winder positions are simultaneously operated by unison actuation of three winder levels, each containing eight winding positions. In the remainder of this description, the invention will be described with reference to a single winding station 20 which may be any one of the winder stations shown in FIG. 1. The motors and cams which drive the winder are, per se, conventional and therefore will not be described in further detail except to say that a single set of four cams and cam followers operate all three levels of winder 10 through suitable shaft linkages.

Figure 2:
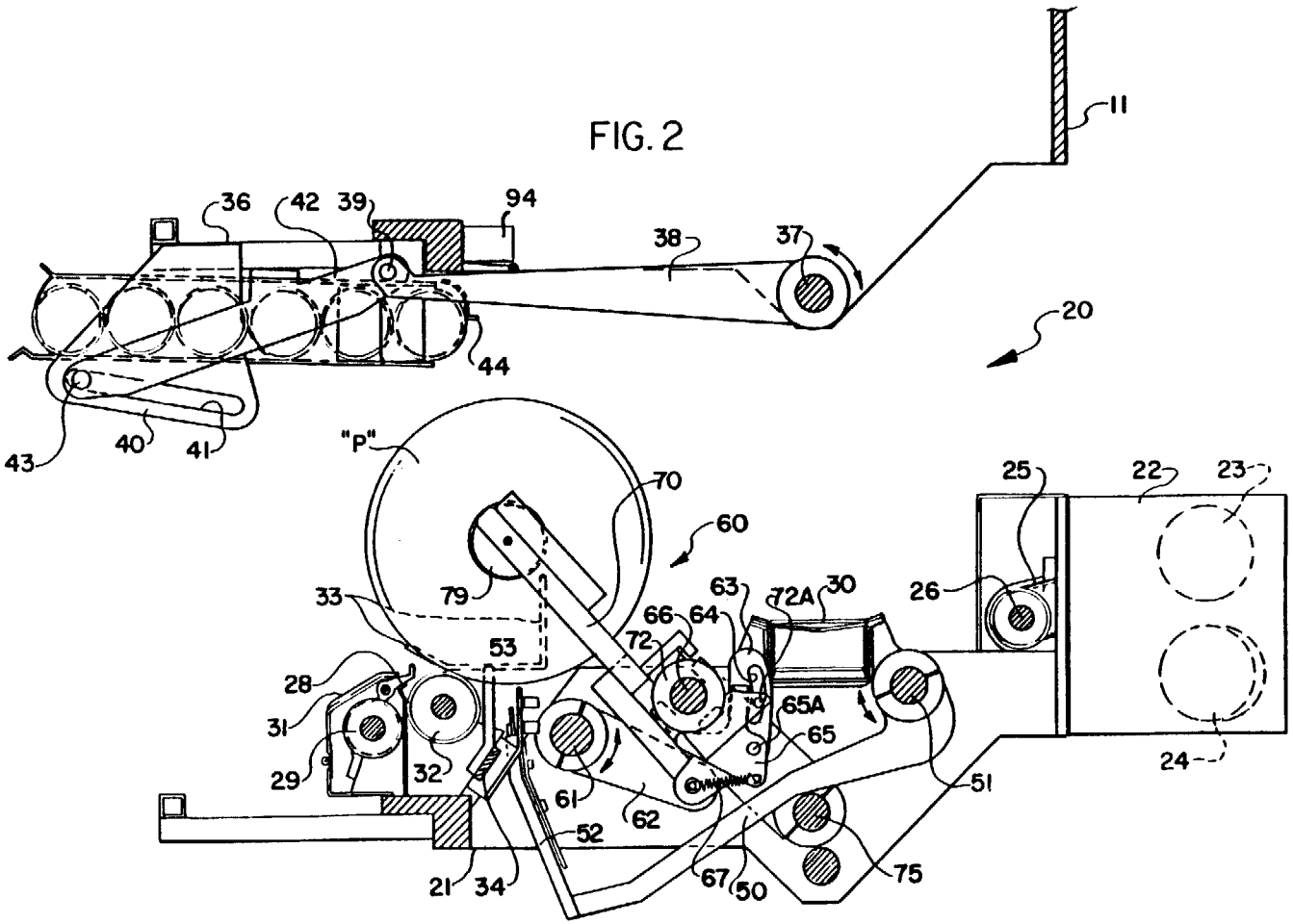
FIG. 2 is a fragmentary, vertical cross-sectional view of one winding station according to the present invention in position immediately before the beginning of the doff cycle.

Referring now to FIG. 2, the invention according to this appliction will be described with reference to a single winding station 20. Winding station 20 is mounted on a frame 21 which supports all of the other components, including the shafts which drive the station from the motor and cam enclosure 12. Yarn is fed to winding position 20 from a feed roll assembly 22 which includes a top feed roll 23 and a bottom feed roll 24 driven by a gear belt 25 off of a feed roll drive shaft 26. The yarn is conveyed across the top of the machine by a yarn guide assembly (not shown) to a yarn guide 28. The yarn guide 28 cooperates with a traverse cam 29 to apply the yarn to a take-up package "P" in a predetermined pattern.

Full take-up packages are conveyed to one end of winder 10 by a conveyor assembly 30 which moves the full packages laterally from the station to one end of the winder enclosure 11.

Cam 29 resides beneath a cam cover 31, beyond which protrudes the yarn guide 28. A drive roll 32 is mounted near to and behind cam 29 and is rotatably driven so as to rotate by surface drive a take-up package. Yarn is guided by yarn guide 28 onto the surface of the take-up package according to the pattern on cam 29.

A yarn bail 33 is mounted to one side of the winding position on a slide 34 for axial movement from one side of the winding position to the other. By moving from one side of the winding position to the other, bail 33 catches the yarn at no matter what position it may then be, and then takes it to a point beyond the axial extent of the take-up package during the doffing and donning operation. The action of bail 33 will be described in more detail below.

A magazine 36 is mounted above cam 29 and drive roll 32 and holds a plurality of empty take-up packages. Magazine 36 is mounted for simultaneous pivoting and translational movement. Magazine 36 pivots through the action of a magazine actuator shaft 37 to which moves a magazine lever 38. The end of magazine lever 38 remote from magazine actuator shaft 37 is pivotally secured to the front of magazine 36 by a pin 39. A magazine slide 40 is attached to the rear of magazine 36 and includes an elongate slot 41. A slide lever 42, also pivotally connected to pin 39, extends from the end of magazine lever 38 to magazine slide 40 and a pin 43 carried by one end of magazine slide 42 rides in slot 41.

As the magazine actuator shaft 37 rotates, the front end of magazine 36 is pivoted downwardly. At the same time, motion of the magazine actuator shaft 37 is translated through slide lever 42 and pin 43 to the slot 41 in magazine slide 40. Therefore, the magazine 36 simultaneously translates and pivots into the proper position for discharging an empty take-up package as will be described in further detail below. The take-up package to be donned therefore moves in a straight-line path to the donning position, making adjustments very accurate and simple.

Magazine 36 also includes a spring-loaded magazine cover 44 which is biased in the downward direction over the discharge end of magazine 36. As a take-up package is pulled from the magazine, the magazine cover is urged upwardly. When the package is completely moved, magazine cover 44 snaps downwardly and prevents the second and subsequent take-up packages from rolling out of the magazine.

Figure 15:
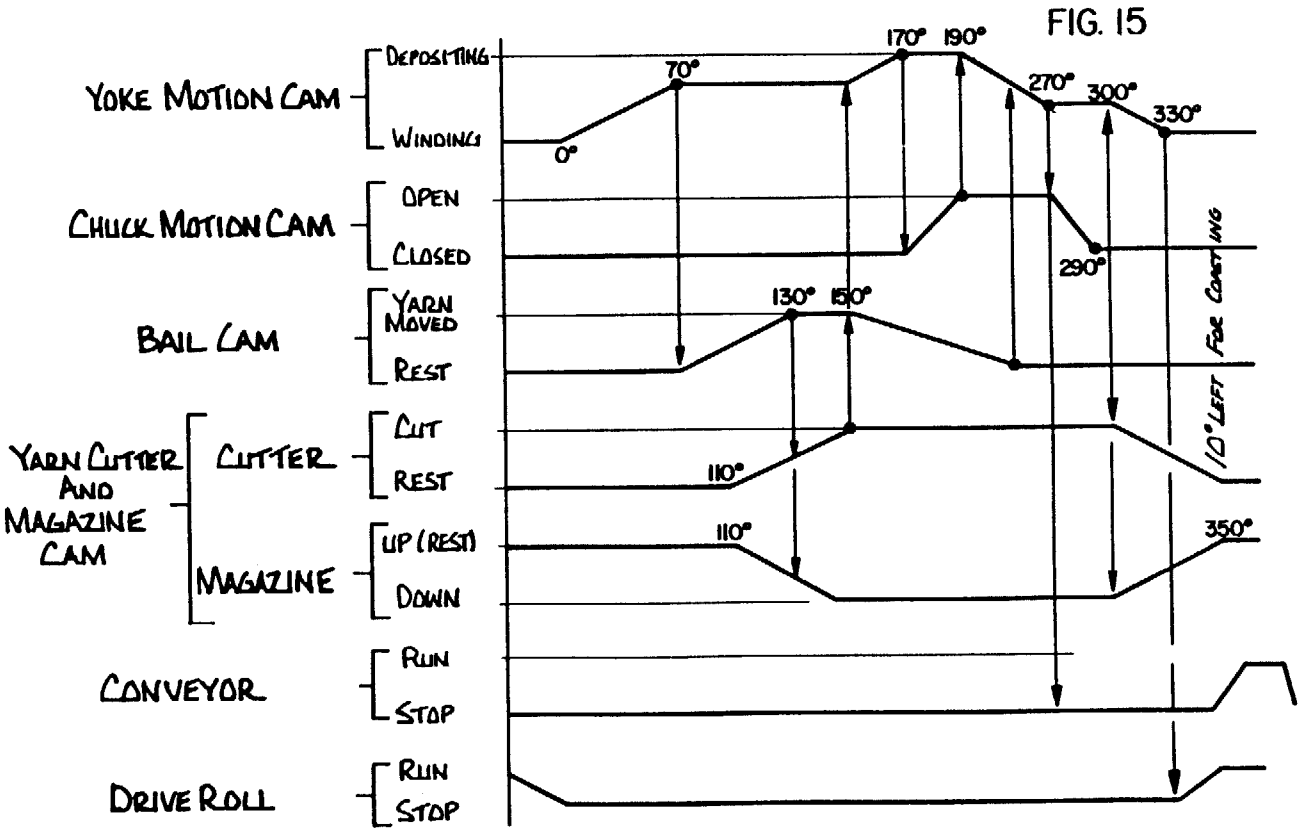
FIG. 15 is a chart showing the movement of the machine cams together with the conveyor and the drive roll; and, FIG. 16 is a view similar to FIG. 2 showing an empty chuck of the yoke in a donning position.

Still referring to FIG. 2, a yarn cutter lever 50 is mounted for rotation on a yarn cutter actuator shaft 51. Mounted on the end of cutter lever opposite from cutter shaft 51 is a cutter arm 52 having a cutter head 53 connected to the end thereof. As cutter actuator shaft 51 moves within a relatively narrow arc, cutter head 53 is raised into and lowered out of yarn cutting and clamping position as will be described below. Magazine actuator shaft 37 and cutter actuator shaft 51 are rotated in unison by a single cam. As will be seen below, the movement of the yarn cutter head 53 and the magazine 36 is syncronized. Rotating both shafts 37 and 51 off of the same cam insures that the proper unison movement is obtained. This relationship is illustrated in FIG. 15.

A yoke assembly, broadly designated at reference numeral 60, is mounted on frame 21 between conveyor 30 and drive roll 32. Yoke assembly 60 includes a yoke doffing shaft 61 which is cam controlled and which moves a yoke actuator arm 62. Yoke actuator arm 62 controls an escapement assembly which includes a yoke pin assembly 63 pivotally mounted on one end of yoke actuator arm 62 and pivoted with an arcuate slot 64 therein. A yoke pin lock 65 is mounted for pivotal movement by means of a pin 65*a* to yoke pin assembly 63. Lock 65 is also connected to one end of the yoke actuator arm 62 and the yoke pin assembly 63 by a spring 67.

Figure 10:
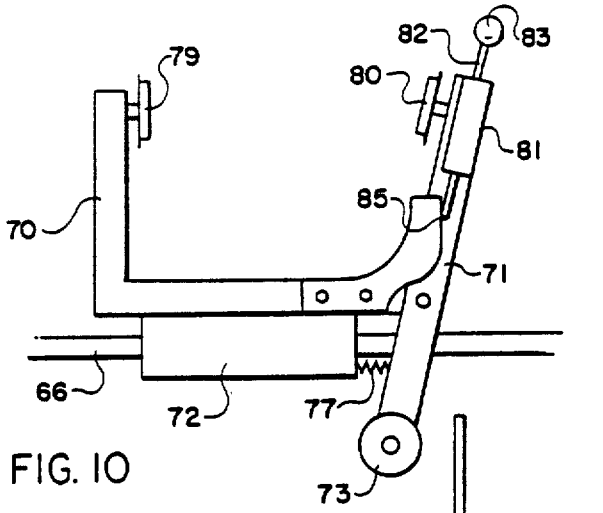
FIG. 10 illustrates the chuck of the yoke in its locked out position.

Referring momentarily to FIG. 10, yoke assembly 60 also includes two spaced-apart chuck arms 70 and 71. Chuck arms 70 and 71 are mounted on a bearing housing 72 for pivotal movement around yoke pivot shaft 66. A pin 72A is positioned in slot 64 and mounted for arcuate movement within the slot 64 on an extension of bearing housing 72. Chuck arm 71 is also pivoted for side to side movement and includes a lower extension arm [72] with a roller 73 mounted to its free, lower end.

A chuck opening shaft 75 is mounted for sliding, side-to-side axial movement below the cutter actuator shaft 51. An upright pusher 76 is secured to chuck opening shaft 75 and as shaft 75 moves, the pusher 76 bears against the roller 73 mounted on the lower end of chuck arm 71.

Chuck arm 71 is normally maintained in a substantially upright, vertical position by means of a return spring 77. Chuck arms 70 and 71 include take-up package retaining discs 79 and 80, respectively, which extend inwardly therefrom and which are adapted to extend into and hold in a rotatable condition open ends of a cylindrical tube.

Chuck arm 71 also includes a lockout mechanism which includes a housing 81 mounted on chuck arm 71 and having an elongate rod 82 slidably positioned therein with a knob 83 on its upper end for moving manually rod 82 up and down. In the view shown in FIG. 10, the yoke assembly 60, including chuck arms 70 and 71 is locked out of operation by lowering rod 82 to a point below a stop defined by the outer edge of an upright chuck stop 85.

The construction of the automatic doffing and donning apparatus has been generally described above. Now the operation of the apparatus, including the method at which the apparatus operates, will be described.

The apparatus is shown in its winding position in FIG. 2. The take-up package is fully wound and has reached its maximum diameter. As the diameter of the take-up package increases, the yoke assembly pivots upwardly around yoke pivot shaft 66. The yoke pin 72A therefore moves in an arcuate path downwardly in slot 64. When the proper amount of yarn has been wound onto the take-up package the automatic doffing and donning cycle is actuated by a convention means such as an r.p.m. counter or limit switch. At the beginning of the doffing cycle, the yarn end must be severed from the full take-up package.

Figure 6:
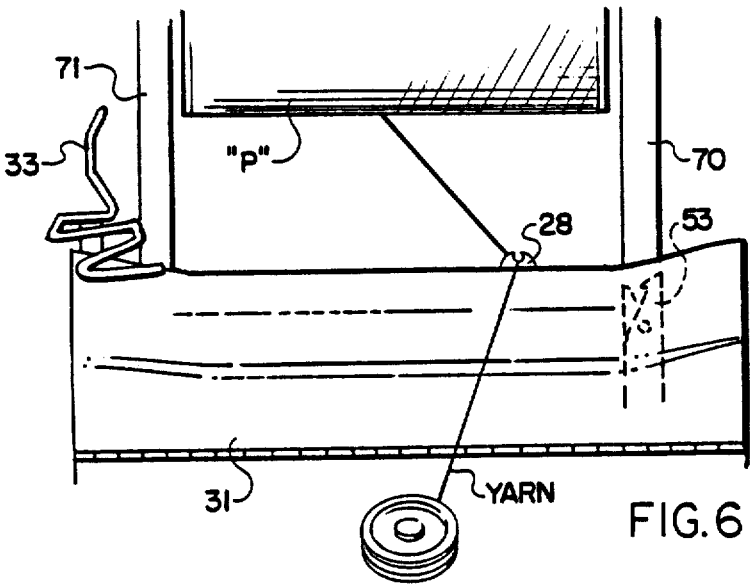
FIG. 6 is a fragmentary, front view of a winder station with the yarn in feeding position on the yarn guide.

Referring now to FIG. 6, the yarn is shown at an intermediate position between the two ends of the take-up package. The drive [rods] *roll* 32 and [cams] *cam* are controlled to start and stop together. The yarn guide 28 may come to rest at any point between the two extremes of the traverse pattern. Therefore, bail 33 is first actuated by the strand bail cam (not shown) which moves slide [64] *34* axially and carries bail 33 from beyond one extreme side of the full take-up package to beyond the other extreme side.

Figure 7:
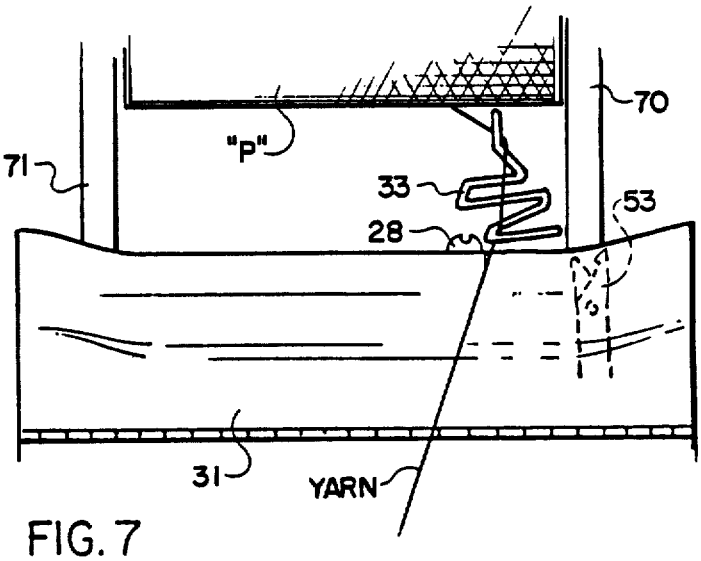
FIG. 7 is a view similar to FIG. 6 showing the bail moving the yarn to one side of the winding position.
Figure 8:
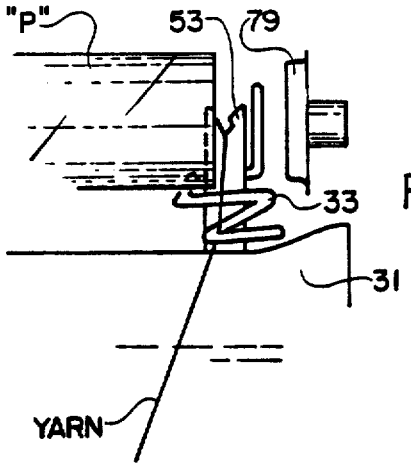
FIG. 8 shows the yarn to one side of the winding position and the cutter head in its raised position with the yarn trapped between its jaws.

As is shown in FIG. 7, bail 33 engages the yarn at two spaced-apart points, one point being in front and one point being behind the drive [bail] *roll* 32, and carries the yarn laterally towards chuck arm 70. During the traverse of bail 33, the yarn cutter/tube magazine cam (not shown) actuates and begins rotating the yarn cutter actuator shaft 51. As is shown in FIG. 8, cutter 53 moves upwardly into a space defined by a bend in bail 33 between the two spaced-apart points on bail 33 which has engaged and carried the yarn to one extreme side of yoke assembly 60 adjacent chuck arm 70. The yarn is held at the two spaced-apart points on bail 33 and the cutter head 53 moves upwardly catching the yarn in its jaws. The yarn is cut and the tail of the yarn on the full take-up package is released. The other end of the yarn which will be attached to the new, empty take-up package is held by cutter clamp 53 momentarily while the full take-up package is doffed.

Figure 3:
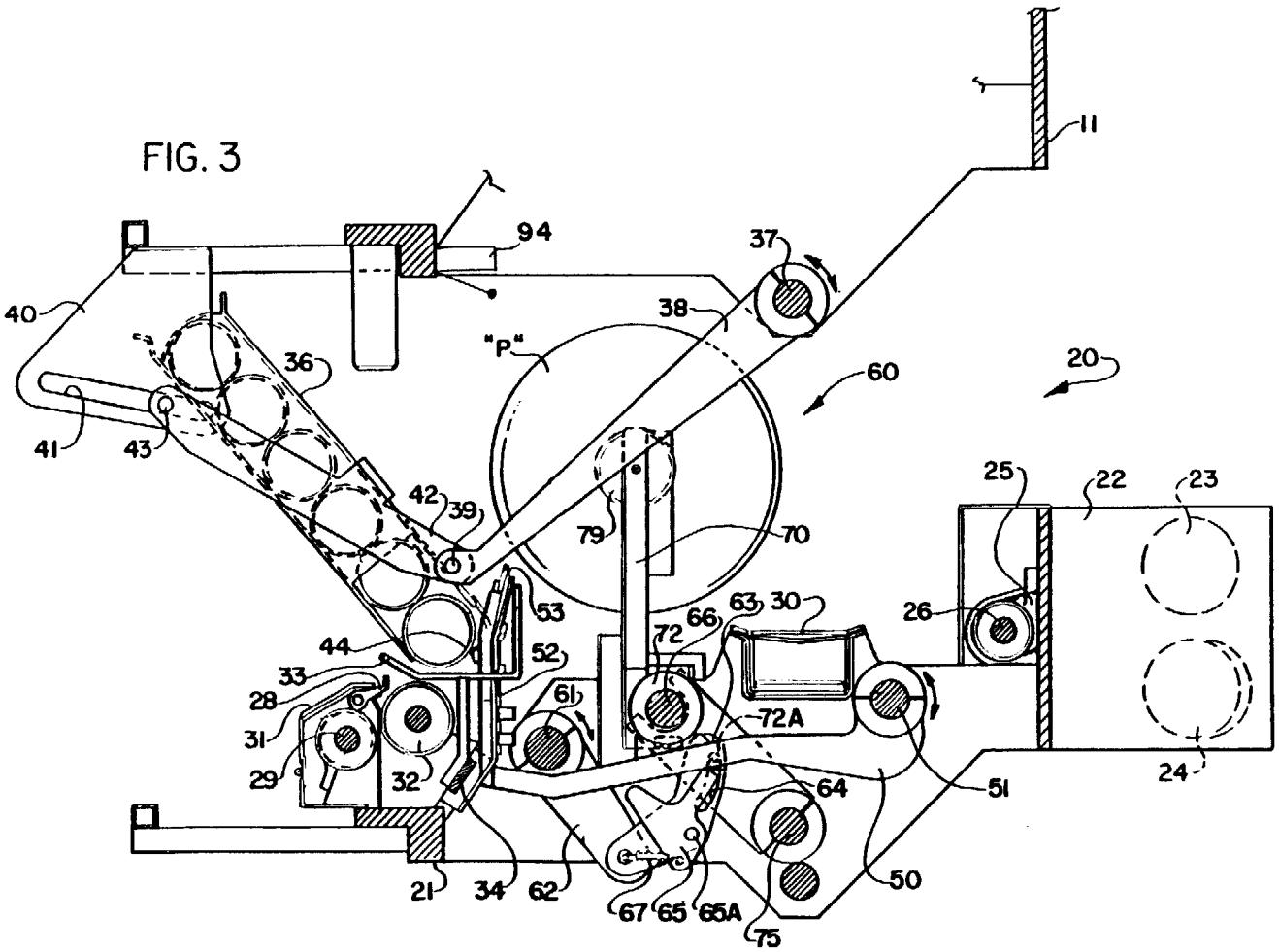
FIG. 3 is a view similar to FIG. 2 during the doffing cycle.

Referring now to FIG. 3, cutter head 53 is shown at the upper extent of its yarn holding position. As mentioned previously, magazine 36 and cutter head 53 are moved in unison by a single cam. Consequently, magazine 36 is simultaneously moved into donning position as is shown in FIG. 3 as the magazine actuator shaft 37 moves magazine lever 38 downwardly.

As is shown in FIG. 3, by the time the cutter head 53 has reached its uppermost position and magazine 36 has reached its lowermost position, yoke assembly 60 has moved to the full take-up package into a substantially vertical position. This occurs as the yoke cam (not shown) rotates the yoke doffing shaft 61. Yoke actuator arm 62 moves clockwise, pulling with it yoke pin assembly 63. As this happens, pin 72A, which is stationary, moves relative to slot 64 until it engages the upper stop of slot 64 on yoke pin assembly 63. At this point, pin 72A forms a linkage which exerts leverage on the bearing housing 72 which pivots around the yoke pivot shaft 66. Chuck arms 70 and 71 are therefore pivoted upwardly away from drive roll 33 towards conveyor 30. As the yoke actuator arm 62 continues its clockwise movement, it pivots yoke pin lock 65 clockwise on pin 65A so that the yoke pin lock 65 moves across slot 64 on yoke pin assembly 63. Yoke pin lock 65 locks yoke pin 72A against the upper end of slot 64. Therefore as yoke arms 70 and 71 continue their pivotal movement toward conveyor 30, they are prevented from falling under their own weight since pin 72A is prevented from moving in slot 64. To summarize, FIG. 3 shows the doffing apparatus at an intermediate position where cutter head 53 is at its uppermost position and holds the cut yarn. Magazine 36 has lowered into its lowermost, donning position. Yoke arms 70 and 71 are carrying the full take-up package towards the conveyor 30.

Figure 5:
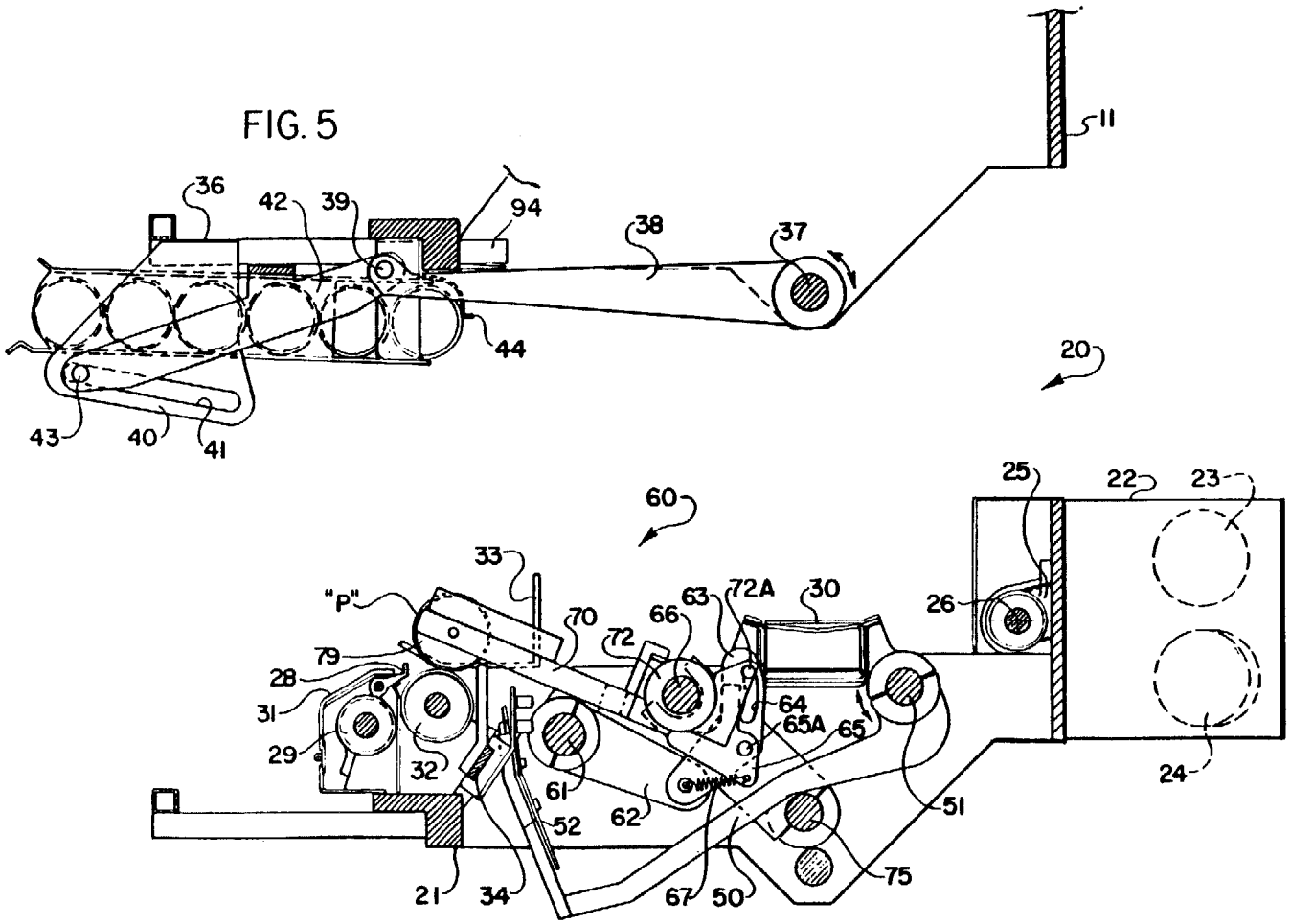
FIG. 5 is a view similar to FIG. 2 showing a newly doffed take-up package in position against the drive-roll.

FIG. 5 illustrates how the yoke pin lock 65 releases yoke pin 72A. In FIG. 5, the yoke actuator 62 has reached its most counter-clockwise position. In this position, the yoke pin lock 65 is moved against and interferes with the bearing housing 72 and is pivoted counterclockwise in opposition to the bias of spring 67. This counterclockwise movement moves the upper end of the yoke pin lock 65 from under the yoke pin 72A, releasing it. Thereafter, yoke arms 70 and 71 are free to pivot clockwise around yoke pivot shaft 66 as the radius of the package "P" increases.

During the doffing cycle a yoke cam (not shown) rotates the yoke doffing shaft 61 which in turn moves the yoke actuator arm 62 clockwise. The pivotal movement of the yoke actuator arm 62 pulls with it the yoke pin assembly 63. As this happens, yoke pin lock 65 is moved away from bearing housing 72. Spring 67 swings the yoke pin lock 65 towards yoke pin 72A. Yoke pin lock 65 moves clockwise under yoke pin 72A and locks it into a fixed position in relation to yoke pin lock 65.

Figure 4:
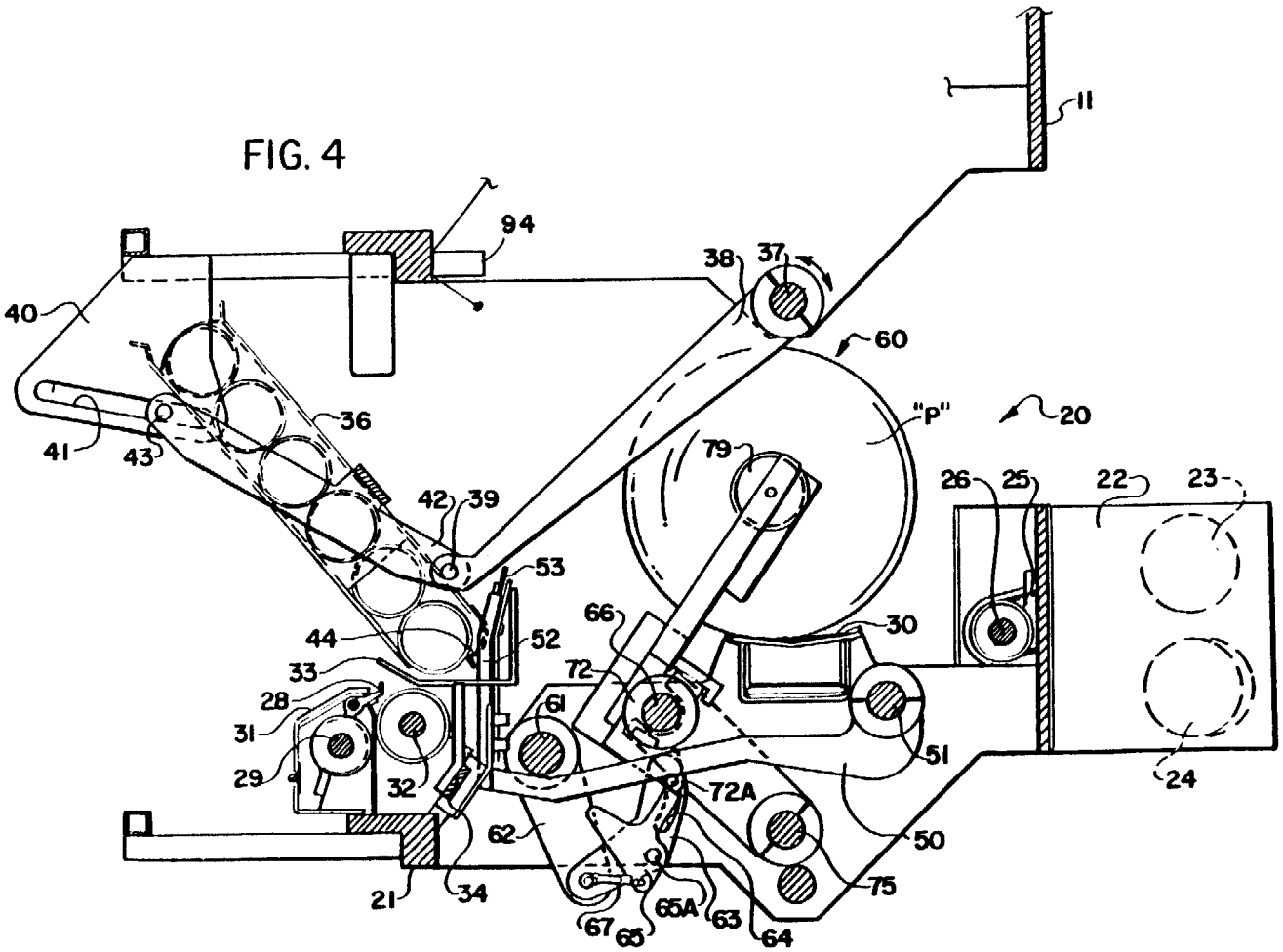
FIG. 4 is a view similar to FIG. 2 showing the full take-up package being deposited on the conveyor.
Figure 11:
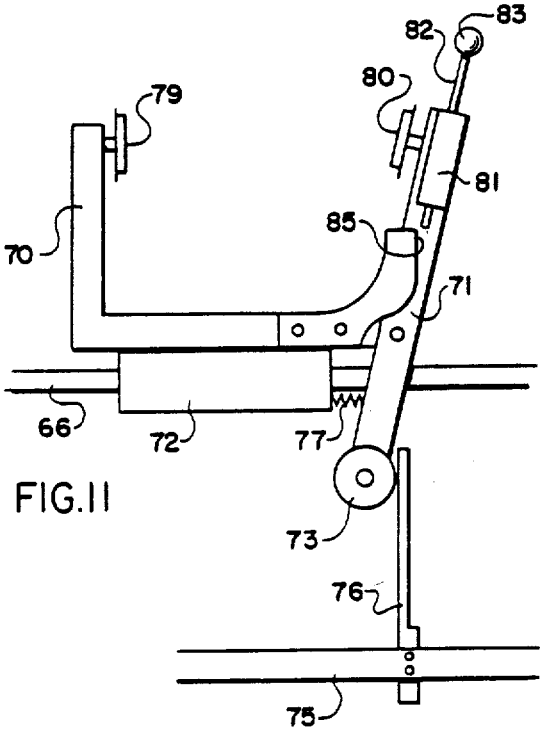
FIG. 11 illustrates the yoke in its open or "first" position.

Referring now to FIG. 4, the yoke assembly 60 has continued its movement over center and has deposited the take-up package on conveyor 30. As this happens, the chuck cam (not shown) actuates and moves the chuck opening shaft 75 in an axial direction. As is shown in FIG. 11, chuck opening shaft 75 moves from right to left and the pusher 76 pushes roller 73 with it. Spring 77 is compressed and chuck arm 71 and disc 80 move away from the take-up package releasing it and allowing it to remain on conveyor 30.

Figure 16:
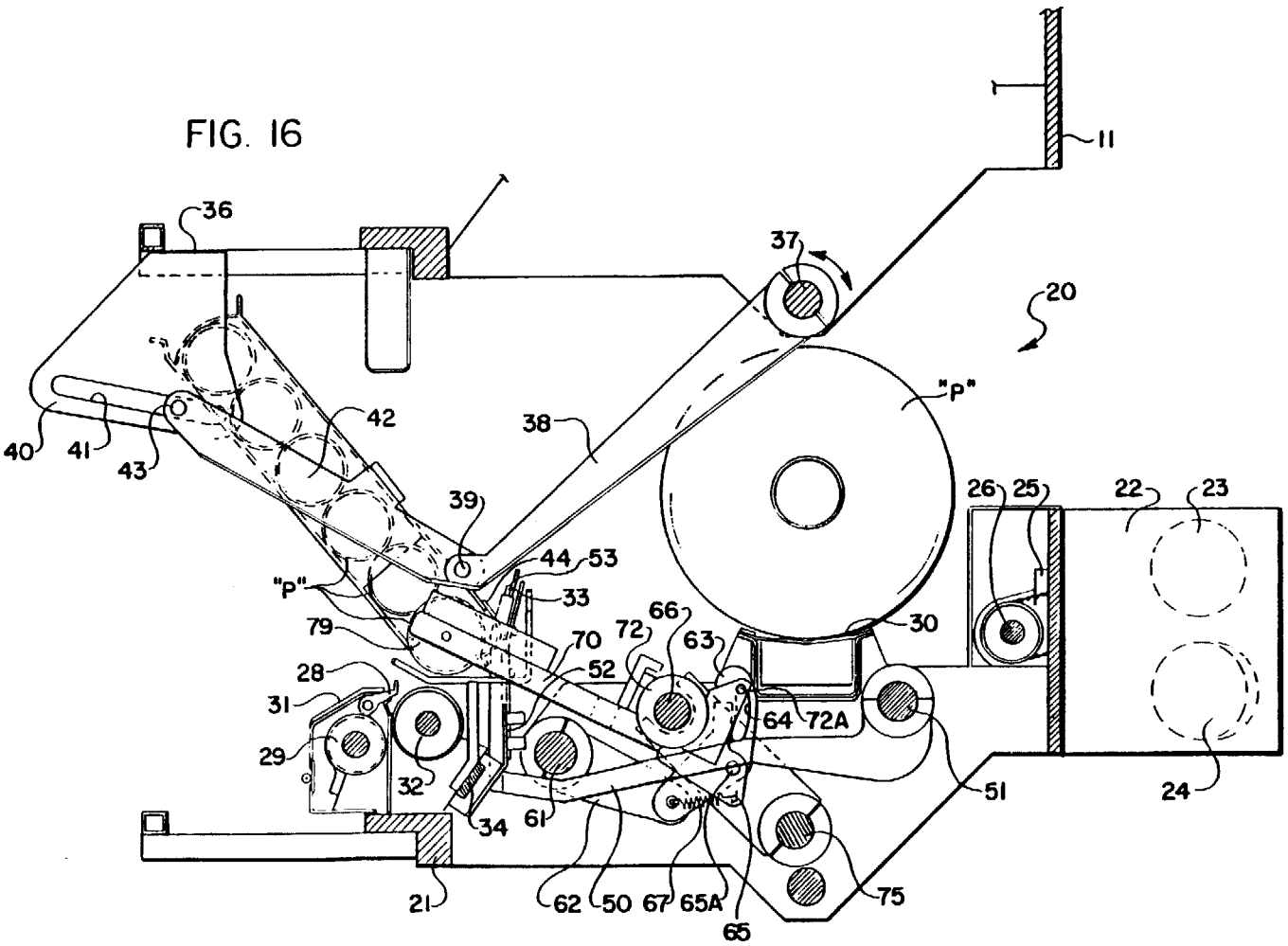

As soon as the take-up package is deposited on conveyor 30, yoke assembly 60 begins counter-clockwise reciprocation back towards drive roll 32 and the donning position. As the empty chuck arms 70 and 71 reach their vertical, over center position and start downwardly towards drive roll 32, yoke pin assembly 63 pivots to a point where spring 67 permits yoke pin lock 65 to snap back into its unlocked position, freeing slot 64 for movement of pin 72A during the next winding cycle. Chuck arms 70 and 71 are carried to within approximately 10° or less of arc with drive roll 33. Chuck arm 70 is shown in this position in FIGS. 16 and 9.

Figure 9:
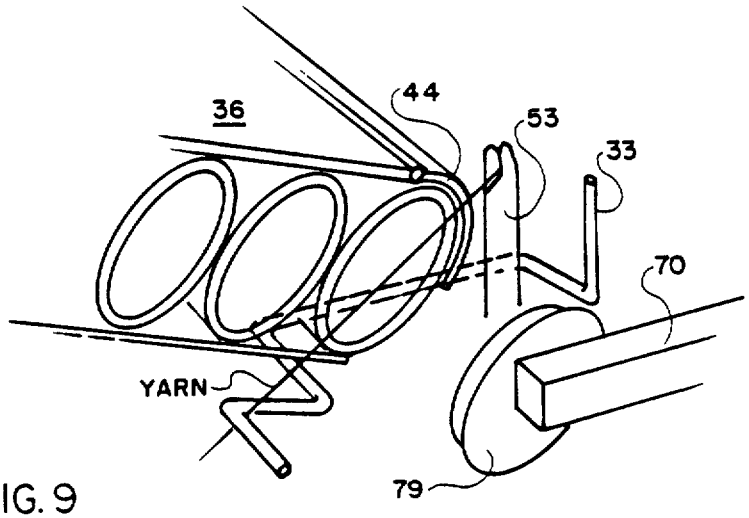
FIG. 9 is a fragmentary perspective view showing the position of the yarn cutter and chuck similar to that in FIG. 8.

In FIG. 9, magazine 36 is in its donning position and when chuck arms 70 and 71 move towards each other, the tube retaining disc 79 will fit into the open end of the take-up package. The yarn is held by cutter head 53 in an axially intersecting position over the end of the empty take-up package and will be tightly clamped when tube retaining disc 79 is inserted into the open end of the take-up package. As soon as the empty take-up package is donned onto chuck arms 70 and 71, cutter head 53 begins downward movement to its lowermost position and magazine 36 begins its upward movement to its retracted position. As this happens, the magazine cover 44 is biased upwardly over the lowermost take-up package which has been donned onto chuck arms 70 and 71. As soon as the lowermost tube is retracted from magazine 36, magazine cover 44 snaps shut over the mouth of the magazine so the remaining tubes do not also exit.

Figure 12:
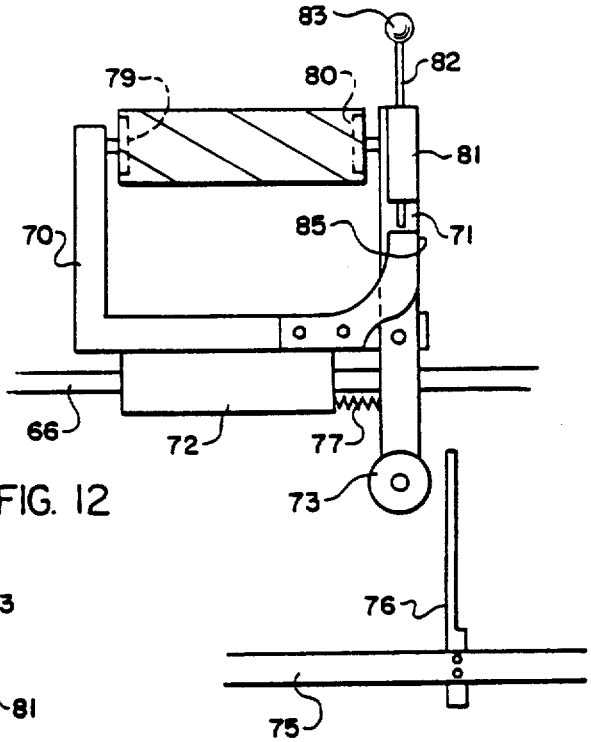
FIG. 12 illustrates the chuck donned with an empty take-up package and with the chuck in its normal, or "second" position.

Referring to FIG. 12, the correct donned position of [yoke] *chuck opening* shaft 75 and chuck arms 70 and 71 is shown. Tube retaining discs 79 and 80 are properly inserted in the opposite ends of the take-up package. The [yoke] *chuck opening* shaft 75 has moved from left to right and has disengaged pusher 76 from roller 73.

Figure 13:
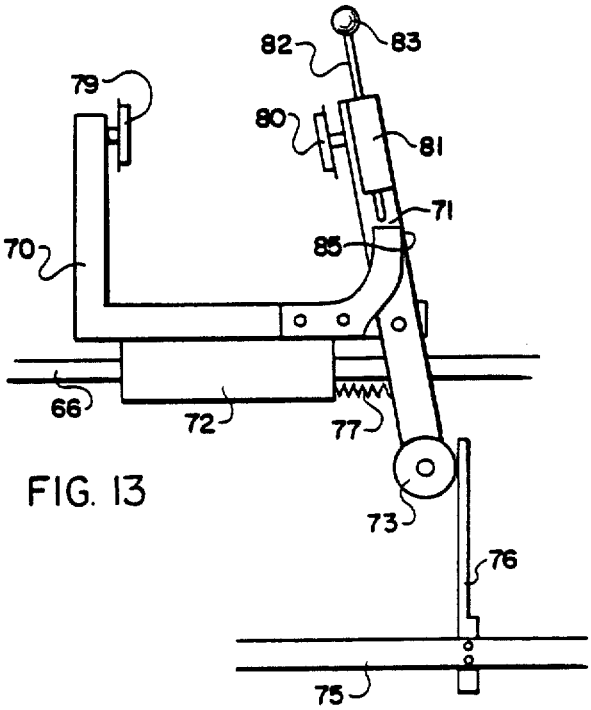
FIG. 13 illustrates the chuck in its "missing tube", or "third" position without a tube wherein a "missing tube" signal is given.

Now referring to FIG. 13, if the magazine 36 is empty or if the empty take-up package has otherwise not been properly donned on tube retaining discs 79 and 80, the tube retaining disc 80 is not positioned in the end of the empty take-up package as in FIG. 12, but rather continues inwardly into a "closed" position under the urging of return spring 77. This carries pusher roller 73 further to the right and into engagement with pusher 76. The position shown in FIG. 13 results in a signal being generated which alerts operating personnel that a misfeed has occurred or, more likely, that the supply of empty take-up packages in magazine 36 is exhausted and needs replenishment.

Figure 14:
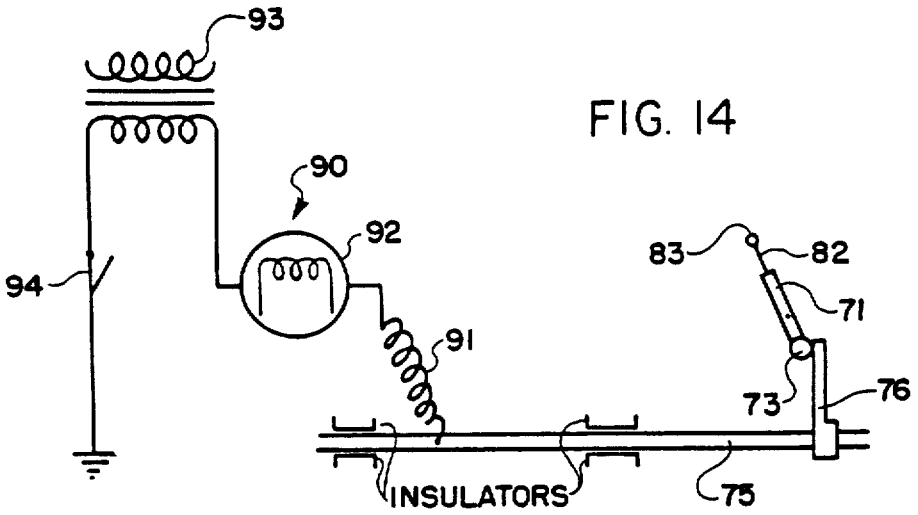
FIG. 14 is a simplified electrical schematic of the "missing tube" detector.

This signal is generated as is shown schematically in FIG. 14. [Yoke] *Chuck opening* shaft 75 is grounded and operatively connected to a suitable electrical circuit 90 which includes wiring 91, a signal, such as a light 92 and a power source 93. The circuit also includes an on-off switch 94 for disconnecting the alarm system. If donning occurs in the proper manner, roller 73 does not engage pusher 76 and since the circuit is grounded on the machine, no alarm is signaled. Switch 94 remains open during the doffing cycle so that an alarm signal is not given while all of the packages are being doffed and the yoke is open as is shown in FIG. 11. When the doffing cycle terminates, switch 94 is closed and, thereafter, if any of the rollers 73 engage their respective pusher 76, the circuit is closed and the signal light 92 is activated. Of course, an audible signal may be added to or substituted for light 92.

A substantial advantage of this type of system is that only one circuit need be provided for each level of the machine. The circuit can be closed at any of 8 different positions on the winder now during each doffing cycle. The number of components is substantially reduced and the reliability of the system is greatly enhanced since many fewer adjustments are required and there are many fewer components to malfunction.

Referring to FIG. 10, a means is shown by which an individual station can be locked out of operation. With lockout rod 82 in its lower position, roller 73 is positioned so that it does not contact pusher 76 at any point during its axial traverse. A take-up package will not be donned onto the tube retaining disc 79 and 80 and, when magazine 36 retracts, the tube stays in the magazine. When [yoke] *chuck opening* shaft 75 moves to its closed position, no signal is given since roller 73 and pusher 76 do not touch. Since the chuck remains open, the magazine 36 does not need to be emptied in order to lock a position out of operation.

Ordinarily, the alarm circuit will also be connected to the drive motor of the winder so that the next winding cycle does not begin until the problem has been checked and a take-up package is donned where necessary.

As soon as the packages are properly donned, the drive roll begins winding yarn onto the empty take-up packages. The conveyor is also actuated and the full take-up packages are carried to the end of the machine where they are removed.

The operation of the machine, and in particular the four cams which control the doffing and donning cycle, are summarized in FIG. 15. As is shown, the yoke motion cam begins its upward movement as soon as the drive rolls have stopped, at 0° position. As soon as the take-up package has been raised off the drive roll a sufficient distance to permit the bail to pass beneath, the bail cam begins axial movement of the bail 33 axially from one end of the take-up package to the other. The yarn cutter and magazine cam begins raising the cutter head 53 and lowering the magazine 36, respectively, at approximately 110°, reaching their proper donning positions at 150°. At 170° the yoke motion cam has positioned the yoke arms 70 and 71 over conveyor 30 and the chuck motion cam opens chuck arms 70 and 71 so that the take-up package is deposited on conveyor 30.

Movement of chuck arms 70 and 71 back in the direction of drive roll 33 begins at 190° and is completed at 270°. At 270° the chuck motiom cam closes chuck arms 70 and 71, thereby donning the empty take-up package. At 260° the bail has left the yarn clamped in cutter head 53 and has moved back to its rest position adjacent chuck arm 71. As soon as the donning is complete at 300°, enter head 53 and magazine 36 are simultaneously moved and reach their retracted positions at 350°. After donning at 300°, the yoke assembly moves into contact with drive roll 32 and at 330°, the empty take-up package is in position against drive roll 32 and the winding process is ready to begin. This position is shown in FIG. 5.

As soon as the empty take-up package is in position against drive roll 32, drive roll 32 is actuated and begins rotating, winding yarn onto the empty take-up package.

In the particular embodiment of the invention disclosed in this application, the empty take-up package is donned in closely spaced-apart relation to drive roll 32. This is because the magazine 36 and cutter head 53 are driven from one cam. Lowering the magazine [53] *36* would raise the cutter head 53 up. However, in relation to the prior art, donning for all practical purposes takes place at the winding position and this is considered novel. The empty take-up package could be donned directly in contact with drive roll 32 if desired and with some modifications, such as driving the cutter head 53 from its own cam.

A method and apparatus for automatically doffing and donning take-up packages on a winder is described above. Various details of the invention may be changed without departing from its scope. Furthermore, the foregoing description of a preferred embodiment of the method and apparatus according to the present invention is provided for the purpose of illustration only and not for the purpose of limitation—the invention being defined by the claims.

*I claim:*

1. In a strand processing machine for winding a strand from a strand supply source onto a take-up package, a yoke having a chuck for holding the take-up package, a drive roll for driving the take-up package to thereby wind the strand thereon, a guide for guiding the strand onto the take-up package in a pre-determined pattern, means for stopping yarn feeding and rotation of the drive roll, a strand cutter for cutting the stationary strand from the take-up package to be doffed and a conveyor for receiving a full take-up package from the yoke and moving it to a discharge point, the improvement which comprises a positive control apparatus for doffing a full take-up package from and donning an empty take-up package onto the yoke, said doffing and donning apparatus comprising:

(a) means for pivoting the yoke away from the drive roll under positive control to the conveyor;

(b) means for depositing the full take-up package on the conveyor;

(c) means for returning the empty chuck of the yoke to a donning position in closely spaced-apart relation from the driving position of the empty take-up package against the drive roll;

(d) means for moving an empty take-up package to the chuck of the yoke at its position in said closely spaced-apart relation from the driving position against the driving roll whereupon the empty take-up package is donned into the chuck of the yoke; and (e) means for attaching the free end of the strand to be wound onto the take-up package in said closely spaced-apart relation from the driving position of the take-up package against the drive roll;

whereby the strand remains relatively taut as the take-up package moves into contact with the drive roll is not susceptible to tangling or being jerked by the take-up package as winding starts.

2. In a strand processing machine according to claim 1, and including a bail for moving between said drive roll and said take-up package for carrying the strand to a point beyond one axial end of the take-up package during doffing and during donning until the strand is attached to the empty take-up package.

3. In a strand processing machine according to claim 1, wherein the empty take-up package is transferred to the chuck of the yoke and the strand is attached to the empty take-up package in spaced-apart relation of no more than 10° of arc from the driving the position against the drive roll in order to prevent the strand applied to the empty take-up package from going slack as the empty take-up package moves from its donning position to its driving position.

4. In a strand processing machine according to claim 1, including means pivotally mounting said yoke on a fixed pivot intermediate the conveyor and the drive roll for pivotal movement therebetween.

5. In a strand processing machine according to claim 1, including bail means for supporting the strand at two spaced-apart points, one point on either side of said strand cutter and further wherein said strand cutter positions the cut strand in axially intersecting position over one end of the empty take-up package in position to be clamped by the chuck as the new take-up package is donned.

6. In a strand processing machine according to claim 1, and including escapement means for permitting the yoke to freely move away from the drive roll as the strand is applied thereto and the diameter of the take-up package increases while also enabling the yoke to be positively controlled in both its movement to the conveyor and its return movement to the donning position adjacent the drive roll.

7. In a strand processing machine according to claim 1, including means for donning the empty take-up package and attaching the strand to the donned take-up package at the same closely spaced-apart position to the drive roll.

8. In a strand processing machine according to claim 6, wherein said escapement means comprises:

(a) a pin mounted on said yoke for movement in a pre-determined arc as the diameter of the take-up package increases;

(b) a yoke pin having a slot therein corresponding to the arc of movement of the yoke pin, and in which said yoke pin progressively moves as the diameter of the take-up package increases;

(c) a stop defined by said yoke pin assembly at one end of said slot;

(d) a yoke actuator for moving said yoke pin assembly to the position where the yoke pin bears against said stop and thereafter transmits pivoting motion of said yoke actuator to the yoke; and, (e) locking means for locking the yoke pin against the stop and preventing the yoke from falling under its own weight as the yoke is pivoted over center and into its doffing position over the conveyor.

9. In a method of doffing a take-up package from and donning a take-up package onto a chuck carried by a yoke on a strand processing machine of the type wherein the take-up package is driven by a drive roll to thereby wind a strand thereon from a supply source, the yarn and the drive roll are stopped, the full package is doffed from the chuck and the strand cut, an empty take-up package is donned onto the chuck, the strand attached to the empty take-up package and winding is resumed, the improvement which comprises:

(a) pivoting the yoke away from the drive roll under positive control to [the] *a* conveyor and depositing the take-up package on the conveyor;

(b) pivoting the yoke back to a position closely adjacent to the drive roll;

(c) transferring the empty take-up package to the chuck of the yoke and attaching the strand to the empty take-up package in spaced-apart relation of no more than 10° of arc from the driving position of the take-up package against the drive roll; and (d) moving the yoke with the newly donned take-up package thereon into driving contact with the drive roll, whereby the strand remains relatively taut as the take-up package is moved into driving contact with the drive roll and is therefore not susceptible to tangling or being jerked by the take-up package as winding starts.

10. In a method according to claim 9 and including the additional step of moving a bail between the drive roll and the full take-up package before doffing to carry the strand to a point beyond one axial end of the take-up package during doffing and during donning until the strand is attached to the empty take-up package.

11. In a method according to claim 9 and including the additional step of positioning the cut strand in axially intersecting position over one end of the empty take-up package in position to be clamped by the chuck as the new take-up package is donned.

12. In a method according to claim 9 and including the step of gripping the yarn immediately downstream of the full take-up package; moving the strand to a point beyond one axial end of the take-up package; moving the strand radially into axially intersection position over one end of the empty take-up package between the empty take-up package and the chuck and cutting the strand to release the strand from the full take-up package; and, permitting the strand to be clamped by the chuck and thereby attached to the take-up package as the new take-up package is donned.

13. In a strand processing machine for winding a strand from a strand supply source onto a take-up package, a yoke having a chuck for holding the take-up package, a drive roll for driving the take-up package to thereby wind the strand thereon, a guide for guiding the strand onto the take-up package in a pre-determined pattern, means for stopping rotation of the drive roll, a strand cutter for cutting the strand from the take-up package to be doffed and a conveyor for receiving a full take-up package from the yoke and moving it to a discharge point, the improvement which comprises a positive control apparatus for doffing a full take-up package from and donning an empty take-up package onto the yoke, said doffing and donning apparatus comprising:

(a) means for pivoting the yoke away from the drive roll under positive control to the conveyor;

(b) means for depositing the full take-up package on the conveyor;

(c) means for returning the empty chuck of the yoke to a donning position in closely spaced-apart relation from the winding position against the drive roll, wherein said spaced-apart relation is sufficient to maintain the strand in a relatively taut manner as the take-up package moves into contact with the drive roll and further wherein the yarn is not susceptible to tangling or being jerked by the take-up package as winding starts;

(d) means for moving an empty take-up package to the chuck of the yoke;

(e) means for donning the empty take-up package into the chuck of the yoke; and (f) means for attaching the free end of the strand to be wound onto the empty take-up package in closely adjacent relation to the drive roll before winding is resumed.

*14. In a strand processing machine for winding a strand from a strand supply source onto a take-up package, a yoke having a chuck for holding the take-up package, a drive roll for driving the take-up package in a driving position to thereby wind the strand thereon, magazine means for receiving and holding a plurality of empty take-up packages for being donned onto the chuck of the yoke, the improvement which comprises an apparatus for donning an empty take-up package onto the yoke, said donning apparatus comprising:*

*(a) means for moving an empty chuck of the yoke to a donning position in closely spaced-apart relation from the driving position of the empty take-up package against the drive roll;*

*(b) means for moving the magazine means to the chuck of the yoke at the donning position in said closely spaced-apart relation from the driving position against the drive roll whereupon one of the empty take-up packages in the magazine means is donned into the chuck of the yoke in closely spaced-apart relation from the drive roll; and*

*(c) means for attaching a free end of the strand to be wound onto the take-up package in said closely spaced-apart relation from the driving position of the take-up package against the drive roll; whereby the strand remains relatively taut as the take-up package moves into contact with the drive roll and is not susceptible to tangling or being jerked by the take-up package as winding starts.*

*15. In a strand processing machine according to claim 14, and including*

*a bail for moving between said drive roll and said take-up package for carrying the strand to a point beyond one axial end of the take-up package during donning until the strand is attached to the empty take-up package.*

*16. In a strand processing machine according to claim 14, wherein the strand is attached to the empty take-up package in spaced-apart relation of no more than 10° of arc from the driving position against the drive roll in order to prevent the strand applied to the empty take-up package from going slack as the empty take-up package moves from its donning position to its driving position.*

*17. In a strand processing machine according to claim 14, including*

*a conveyor for receiving a full take-up package from the yoke and moving it to a discharge point,*

*means pivotally mounting said yoke on a fixed pivot intermediate the conveyor and the drive roll for pivotal movement therebetween.*

*18. In a strand processing machine according to claim 14, including*

*a strand cutter for cutting the strand from the take-up package to be doffed,*

*bail means for supporting the strand at two spaced-apart points, one point on either side of said strand cutter and the strand cutter further comprising means for positioning the cut strand in axially intersecting position over one end of the empty take-up package in position to be clamped by the chuck as the new take-up package is donned.*

*19. In a strand processing machine according to claim 14, and including*

*escapement means for permitting the yoke to freely move away from the drive roll as the strand is applied thereto and the diameter of the take-up package increases while also enabling the yoke to be positively controlled in both its movement to a conveyor and its return movement to the donning position adjacent the drive roll.*

*20. In a strand processing machine according to claim 14, including* means for donning the empty take-*up package and attaching the strand to the donned take-up package at the same closely spaced-apart position to the drive roll.*

*21. In a strand processing machine according to claim 19, wherein said escapement means comprises:*

*(a) a pin mounted on said yoke for movement in a predetermined arc as the diameter of the take-up package increases;*

*(b) a yoke pin assembly having a slot therein corresponding to the arc of movement of the yoke pin, and in which said yoke pin progressively moves as the diameter of the take-up package increases;*

*(c) a stop defined by said yoke pin assembly at one end of said slot;*

*(d) a yoke actuator for moving said yoke pin assembly to the position where the yoke pin bears against said stop and thereafter transmits pivoting motion of said yoke actuator to the yoke; and*

*(e) locking means for locking the yoke pin against the stop and preventing the yoke from falling under its own weight as the yoke is pivoted over center and into a doffing position over the conveyor.*

*22. In a method of donning a take-up package onto a chuck carried by a yoke on a strand processing machine having magazine means for receiving and holding a plurality of take-up packages for being donned onto the chuck of the yoke and wherein the take-up package is driven in a driving position by a drive roll to thereby wind a strand thereon from a supply source, the improvement which comprises:*

*(a) pivoting the yoke to a position closely adjacent to the drive roll;*

*(b) transferring the magazine means to the chuck of the yoke;*

*(c) transferring the empty take-up package from the magazine to the chuck;*

(d) attaching the strand to one of the empty take-up packages in the magazine means while the package is in spaced-apart relation of no more than 10° of arc from the driving position of the take-up package against the drive roll; and (e) moving the yoke with the newly donned take-up package thereon into driving contact with the drive roll, whereby the strand remains relatively taut as the take-package is moved into driving contact with the drive roll and is therefore not susceptible to tangling or being jerked by the take-up package as winding starts.

23. In a method according to claim 22 and including the additional step of moving a bail between the drive roll and a full take-up package to carry the strand to a point beyond one axial end of the take-up package until the strand is attached to the empty take-up package.

24. In a method according to claim 22 and including the additional step of cutting the strand and positioning the cut strand in axially intersecting position over one end of the empty take-up package in position to be clamped by the chuck as the new take-up package is donned.

25. In a method according to claim 22 and including the step of gripping the yarn immediately downstream of a full take-up package;

moving the strand to a point beyond one axial end of the take-up package;

moving the strand radially into axially intersecting position over one end of the empty take- up package between the empty take-up package and the chuck and cutting the strand to release the strand from the full take-up package; and, clamping the strand by the chuck and the empty take-up package and thereby attaching the strand to the take-up package as the new take-up package is donned.

26. In a strand processing machine for winding a strand from a strand supply source onto a take-up package, a yoke having a chuck for holding the take-up package, a drive roll for driving the take-up package in a winding position to thereby wind the strand thereon, magazine means for receiving and holding a plurality of empty take-up packages for being donned onto the chuck of the yoke, the improvement which comprises an apparatus for donning an empty take-up package onto the yoke, said donning apparatus comprising:

(a) means for moving the magazine means to the chuck of the yoke;

(b) means for donning one of the empty take-up packages in the magazine means into the chuck of the yoke in closely spaced-apart relation from the winding position against the drive roll, wherein said spaced-apart relation is sufficient to maintain the strand in a relatively taut manner as the take-up package moves into contact with the drive roll and further wherein the yarn is not susceptible to tangling or being jerked by the take-up package as winding starts; and (c) means for attaching a free end of the strand to be wound onto the empty take-up package in closely spaced-apart relation to the drive roll before winding is resumed.

27. A method of donning a take-up package onto a chuck of a yoke on a strand processing machine having magazine means for receiving and holding a plurality of take-up packages for being donned onto the chuck of the yoke and wherein the take-up package is driven in a driving position by a drive roll to thereby wind a strand thereon, the method comprising:

moving the chuck of the yoke to a position in closely spaced-apart relation from the driving position of the take-up package, effecting relative movement between the magazine means and the drive roll to bring a package held in the magazine means and the drive roll into closely spaced-apart relation to each other, donning one of the take-up packages in the magazine means onto the chuck of the yoke at the position in closely spaced-apart relation from the driving position of the take-up package, attaching the strand to the take-up package at the position in closely spaced-apart relation from the driving position of the take-up package, and moving the yoke with the take-up package thereon into the driving position, whereby the strand remains relatively taut as the yoke with the take-up package thereon is moved into the driving position to thereby eliminate tangling and jerking of the strand by the take-up package as winding starts.

28. A method of donning a take-up package onto a chuck of a yoke on a strand processing machine having magazine means for receiving and holding a plurality of take-up packages for being donned onto the chuck of the yoke and wherein the take-up package is driven in a driving position by a drive roll to thereby wind a strand thereon, the method comprising:

moving the chuck of the yoke to a position in closely spaced-apart relation from the driving position of the take-up package, moving the magazine means to the chuck of the yoke at the position in closely spaced-apart relation from the driving position of the take-up package, donning one of the take-up packages in the magazine means onto the chuck of the yoke at the position in closely spaced-apart relation from the driving position of the take-up package, attaching the strand to the take-up package at the position in closely spaced-apart relation from the driving position of the take-up package, and moving the yoke with the take-up package thereon into the driving position, whereby the strand remains relatively taut as the yoke with the take-up package thereon is moved into the driving position to thereby eliminate tangling and jerking of the strand by the take-up package as winding starts.

29. A method of donning a take-up package onto a chuck of a yoke on a strand processing machine having magazine means for receiving and holding a plurality of take-up packages for being donned onto the chuck of the yoke and wherein the take-up package is driven in a driving position by a drive roll to thereby wind a strand thereon, the method comprising:

moving the chuck of the yoke to a position in closely spaced-apart relation from the driving position of the take-up package, effecting relative movement between the magazine means and the drive roll to bring a package held in the magazine means and the drive roll into closely spaced-apart relation to each other, donning one of the take-up packages in the magazine means onto the chuck of the yoke at the position in closely spaced-apart relation from the driving position of the take-up package,

*attaching the strand to the take-up package at the position in closely spaced-apart relation from the driving position of the take-up package, and*

*establishing driving contact between the take-up package and the drive roll,*

*whereby the strand remains relatively taut as driving contact is established between the take-up package and the drive roll to thereby eliminate tangling and jerking of the strand by the take-up package as winding starts.*

*30. A method of donning a take-up package onto a chuck of a yoke on a strand processing machine having magazine means for receiving and holding a plurality of take-up packages for being donned onto the chuck of the yoke and wherein the take-up package is driven in a driving position by a drive roll to thereby wind a strand thereon, the method comprising:*

*moving the magazine means to the chuck of the yoke,*

*donning one of the take-up packages in the magazine means onto the chuck of the yoke,*

*attaching the strand to the take-up package at a position in closely spaced-apart relation from the driving position of the take-up package, and*

*moving the yoke with the take-up package thereon into the driving position,*

*whereby the strand remains relatively taut as the yoke with the take-up package thereon is moved into the driving position to thereby eliminate tangling and jerking of the strand by the take-up package as winding starts.*

*31. A method of donning a take-up package onto a chuck of a yoke on a strand processing machine having magazine means for receiving and holding a plurality of take-up packages for being donned onto the chuck of the yoke and wherein the take-up package is driven in a driving position by a drive roll to thereby wind a strand thereon, the method comprising:*

*moving the magazine means to the chuck of the yoke,*

*donning one of the take-up packages in the magazine means onto the chuck of the yoke,*

*attaching the strand to the take-up package at a position in closely spaced-apart relation from the driving position of the take-up package, and*

*establishing driving contact between the take-up package and the drive roll,*

*whereby the strand remains relatively taut as driving contact is established between the take-up package and the drive roll to thereby eliminate tangling and jerking of the strand by the take-up package as winding starts.*

*32. A device for donning a take-up package onto a chuck of a yoke on a strand processing machine having magazine means for receiving and holding a plurality of take-up packages for being donned onto the chuck of the yoke and wherein the take-up package is driven in a driving position by a drive roll to thereby wind a strand thereon, the device comprising:*

*means for moving the chuck of the yoke to a position in closely spaced-apart relation from the driving position of the take-up package,*

*means for moving the magazine means to the chuck of the yoke at the position in closely spaced-apart relation from the driving position of the take-up package,*

*means for donning one of the take-up packages in the magazine means onto the chuck of the yoke at the position in closely spaced-apart relation from the driving position of the take-up package,*

*means for attaching the strand to the take-up package at the position in closely spaced-apart relation from the driving position of the take-up package, and*

*means for moving the yoke with the take-up package thereon into the driving position,*

*whereby the strand remains relatively taut as the yoke with the take-up package thereon is moved into the driving position to thereby eliminate tangling and jerking of the strand by the take-up package as winding starts.*

*33. A device for donning a take-up package onto a chuck of a yoke on a strand processing machine having magazine means for receiving and holding a plurality of take-up packages for being donned onto the chuck of the yoke and wherein the take-up package is driven in a driving position by a drive roll to thereby wind a strand thereon, the device comprising:*

*means for moving the magazine means to the chuck of the yoke,*

*means for donning one of the take-up packages in the magazine means onto the chuck of the yoke,*

*means for attaching the strand to the take-up package at a position in closely spaced-apart relation from the driving position of the take-up package, and*

*means for moving the yoke with the take-up package thereon into the driving position,*

*whereby the strand remains relatively taut as the yoke with the take-up package thereon is moved into the driving position to thereby eliminate tangling and jerking of the strand by the take-up package as winding starts.*

*34. A device for donning a take-up package onto a chuck of a yoke on a strand processing machine having magazine means for receiving and holding a plurality of take-up packages for being donned onto the chuck of the yoke and wherein the take-up package is driven in a driving position by a drive roll to thereby wind a strand thereon, the device comprising:*

*means for moving the magazine means to the chuck of the yoke,*

*means for donning one of the take-up packages in the magazine means onto the chuck of the yoke,*

*means for attaching the strand to the take-up package at a position in closely spaced-apart relation from the driving position of the take-up package, and*

*means for establishing driving contact between the take-up package and the drive roll,*

*whereby the strand remains relatively taut as driving contact is established between the take-up package and the drive roll to thereby eliminate tangling and jerking of the strand by the take-up package as winding starts.*

* * * * *